United States Patent [19]

Homberg

[11] Patent Number: 4,735,446
[45] Date of Patent: Apr. 5, 1988

[54] TWINE KNOTTER FOR BALING PRESSES

[75] Inventor: Hans-Erich Homberg, Solingen, Fed. Rep. of Germany

[73] Assignee: P.D. Rasspe Sohne GmbH & Co. KG, Solingen, Fed. Rep. of Germany

[21] Appl. No.: 23,626

[22] Filed: Mar. 9, 1987

[30] Foreign Application Priority Data

Mar. 8, 1986 [DE] Fed. Rep. of Germany ....... 3607694

[51] Int. Cl.⁴ .................. A01D 59/04; B65B 13/26; B65H 69/04; A01F 15/14
[52] U.S. Cl. .......................................... 289/2; 289/10; 289/14
[58] Field of Search .................. 289/2, 10, 14

[56] References Cited

U.S. PATENT DOCUMENTS

| 2,723,871 | 11/1955 | Rudeen | 289/10 |
| 2,823,059 | 2/1958 | Smith | 289/10 |
| 4,223,926 | 9/1980 | Nolt | 289/10 |
| 4,420,177 | 12/1983 | Munro | 289/14 |
| 4,493,498 | 1/1985 | Vansteelant | 289/2 |

OTHER PUBLICATIONS

Kuene, "Landmaschinentechnik II", pp. 85–90.

Primary Examiner—Louis K. Rimrodt
Attorney, Agent, or Firm—Schwartz, Jeffery, Schwaab, Mack, Blumenthal & Evans

[57] ABSTRACT

The twine knotter (10) is designed according to the Deering high-pressure system and, as a result of a greater inclination of the knotter hook (26), has a distance (40), measured along the twine strand (25), between the mid-plane of the knotter hook (26) and the pivoting plane of the knife (20) of at least 40 mm, so that the knot ends become longer. Consequently, where thicker baler twine and correspondingly bulkier knots are concerned, the danger that the knot will come loose under tension is reduced.

2 Claims, 3 Drawing Sheets

TWINE KNOTTER FOR BALING PRESSES

BACKGROUND OF THE INVENTION

1. Field of the Invention

The invention relates to a twine knotter, particularly of the type using the Deering high-pressure system for agricultural baling presses.

2. Related Art

Twine knotters of this type have been customary everywhere for many decades and are of standard construction. In their normal design, they have substantially uniform dimensions. They process sisal hemp twines or synthetic baler twines. In the latter case, to produce conventional bales of hay, straw, waste materials, plants, etc. with a bale cross-section of up to 600 by 600 mm and a bale length of approximately 1 m, baler twines with a run length of 320 to 400 m/kg have been used. The run length indicates the length of 1 kg of a particular twine and is a measure of the "thickness" of the twine.

More recently, baling presses producing considerably larger bales of up to approximately 1400 by 1400 by 2400 mm have been developed and put on the market. Thicker baler twines are obviously required for bales of this type. Where synthetic baler twines are concerned, this means a run length in the range of approximately 300 to 120 m/kg. Of course, the aim is to process these twines on existing twine knotters or, at all events, on those which remain unchanged in terms of their essential dimensions and components.

The same requirement regarding twine thickness as in the production of especially large bales must also be satisfied when bales of conventional dimensions are to be pressed particularly firmly and are accordingly under high pressure.

However, this processing proves difficult in many cases, since the thicker baler twines produce bulkier knots which, when the bale tension is exerted, tend to pull together somewhat, twine material being drawn in from the free knot ends. In many cases, not much of the knot ends then remains, and this results in insecure knots which can come loose.

One type of packing machine not in the agricultural art is illustrated in Kuene, "Landmaschinentechnik II", pp. 85–90. There is much patent art on Deering type knotters, one example being U.S. Pat. No. 2,723,871.

SUMMARY OF THE INVENTION

The object on which the invention is based is to design a twine knotter of the type using the Deering high-pressure system, so that, while preserving its essential constructional features and dimensions, more secure knots can be obtained during the processing of thicker baler twines.

According to the invention, this object is achieved by means of a twine knotter which is designed according to the Deering high-pressure system and, as a result of a greater inclination of the knotter hook, has a distance measured along the twine strand between the mid-plane of the knotter hook and the pivoting plane of the knife of at least 40 mm, so that the knot ends become longer. Consequently, where thicker baler twine and correspondingly bulkier knots are concerned, the danger that the knot will come loose under tension is reduced.

The relevant distance can be increased, without any change in the function of the twine knotter as a whole and without essential modifications having to be made on the press. The effect of increasing the distance is that the distance between the knot formed in the knotter hook and the cutting point at the knot ends becomes greater and consequently the knot ends themselves become longer, so that more twine is available at the knots and can be drawn in without risk when the knot pulls together.

It goes without saying that the expression "at least 40 mm" must be understood as being within a reasonable scope, that is to say only embraces the distance range of over 40 mm which can still be accommodated in terms of construction within knotter frames of conventional size.

A distance range preferred in this respect is 40 to 42 mm.

It is of course possible, in principle, to influene the distance either by shifting the driver and the knife or by shifting the knotter hook. However, the least possible external effect occurs if the increase in distance is produced as a result of a greater inclination of the knotter-hook shaft. This insures that the outer connecting dimensions of the knotter are not influenced at all by the change made in the distance.

BRIEF DESCRIPTION OF THE DRAWINGS

An example of the embodimentof the invention is illustrated in the drawing, wherein.

DETAILED DESCRIPTION OF THE PREFERRED EMBODIMENT

Figure 1:
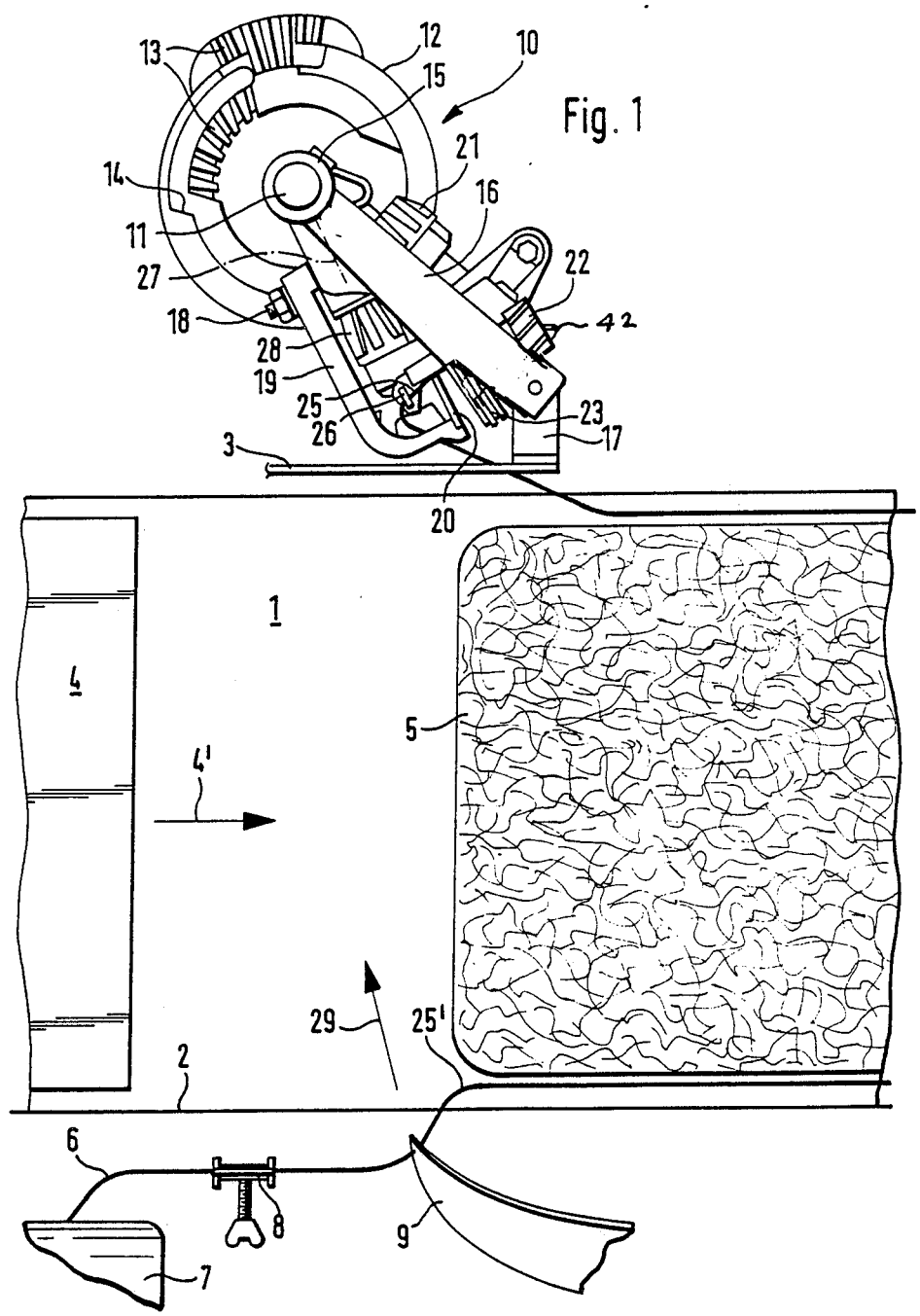
FIG. 1 shows a diagrammatic side-view of a baling press with a twine knotter.

FIG. 1 shows a press channel 1 which is limited by a bottom 2, an upper cover and appropriate side walls. A press plunger 4 according to FIG. 1 is moveable in the press channel to the right and presses a quantity of pressing material, for example straw, not shown in FIG. 1, introduced into the press channel 1 in the left-hand region together with an already previously introduced quantity in several strokes in the direction of the arrow 4' to form a bale 5. The bale moves out of the press channel 1 to the right according to FIG. 1 and is ejected after completion. When the baling press travels across a field, the finished bales fall out at the rear.

So that the bale 5 remains compressed together, loops of baler twine 6 are tied around it in vertical planes parallel to the direction of movement. The baler twine 6 is extracted from a twine stock 7 and maintained under a certain tension by means of a clamping device 8. The strand of baler twine 6 runs through an eye of a baling needle 9, then to the right under the bale 5 forward and up to the end face of the bale 5 on the right according to FIG. 1, upward along the end face and back over the top-side of the bale 5 to the twine knotter 10 which is arranged above the press channel and which, during the formation of the bale 5, holds the twine taut and firm against the pressure of the press plunger 4. There are altogether two or more twine knotters 10 arranged next to one another at a distance from one another in the direction perpendicular to the drawing plane of FIG. 1 and forming a corresponding number of twine loops parallel to one another around the bale 5.

On a base plate 3 located above the upper cover of the press channel 1, there is a knotter shaft 11 which extends horizontally transversely relative to the press channel 1 and to which are connected fixedly in terms of rotation knotter disks 12 which have toothed segments 13 and cam segments 14 for actuating the functional parts of the twine knotter 10. Also mounted on the knotter shaft 11 are the bearing lugs 15 of the knotter frames 16 which, however, do not co-rotate, but are supported against rotation at their free end on a bearing block 17. (The frame 16 has been partially cut away in FIG. 2, and the front part to which reference line 16 in FIG. 1 is directed has been cut away. Thus, there is a different appearance of frame 16 in FIGS. 1 and 2.)

A knife lever 19 with a knife 20 is mounted pivotably on the knotter frame 16 about an axis 18 essentially perpendicular to the axis of the knotter shaft 11. The knife 20 moves in a pivoting plane which passes through the axis of the knotter shaft 11 not exactly, but approximately, and accordingly is perpendicular to the drawing plane of FIG. 1.

Also mounted on the knotter frame 16 is a worm shaft 21, mounted on an axis 41 (FIG. 2), which is driven by one of the toothed segments 13 and which acts via its worm on a pinion 22 located on the axis 31 of the driver 23 which is arranged on the right of the pivoting plane of the knife 20 in FIG. 1. The axis 31 of the driver shaft extends essentially perpendicularly to the pivoting plane of the knife 20. The knife 20 moves relatively closely in front of the driver 23 which consits of several co-axial disks. There is a twine holder which cannot be seen in FIG. 1 and which engages between the disks of the driver 23 and clamps in the driver 23 a twine strand 25 extending transversely relative to the driver 23 through one of its edge recesses 24 (FIG. 3.)

On the side of the pivoting plane of the knife 20 on the left according to FIG. 1, there is the knotter hook 26, the axis 27 of which extends essentially through the axis of the knotter shaft 11 and which is driven by a pinion 28 interacting with one of the toothed segments 13.

In the working phase illustrated in FIG. 1, the upper end of the baler twine 6, that is to say the strand 25, is held in the driver 23 and runs over the knotter hook 26 to the right around the press bale 5. When the press bale 5 is completed, the baling needle 9 pivots upward in the direction of the arrow 29 into the vicinity of the knotter hook and beyond it into the vicinity of the driver 23. The knotter hook at the same time grasps the end 25' of the baler twine and brings it together with the upper end 25, so that the knotter hook 26 can make the knot. The second end 25' is shifted to the right according to FIG. 1, until it can be grasped by driver 23. When the knife lever 19 together with the knife 20 then pivot forward out of the drawing plane according to FIG. 1. The finished knot is severed and the end 25' of the baler twine is grasped in the driver 23. After the knot has been severed, the twine loop around the press bale 5 is closed, and the latter can be ejected from the press channel 1 to the right. New pressing material is then supplied by the press plunger 4, as a result of which the twine strand running from the baling needle 9, in the meantime pulled back downward again, to the driver 23 is taken along to the right with the progressive formation of the bale.

Figure 2:
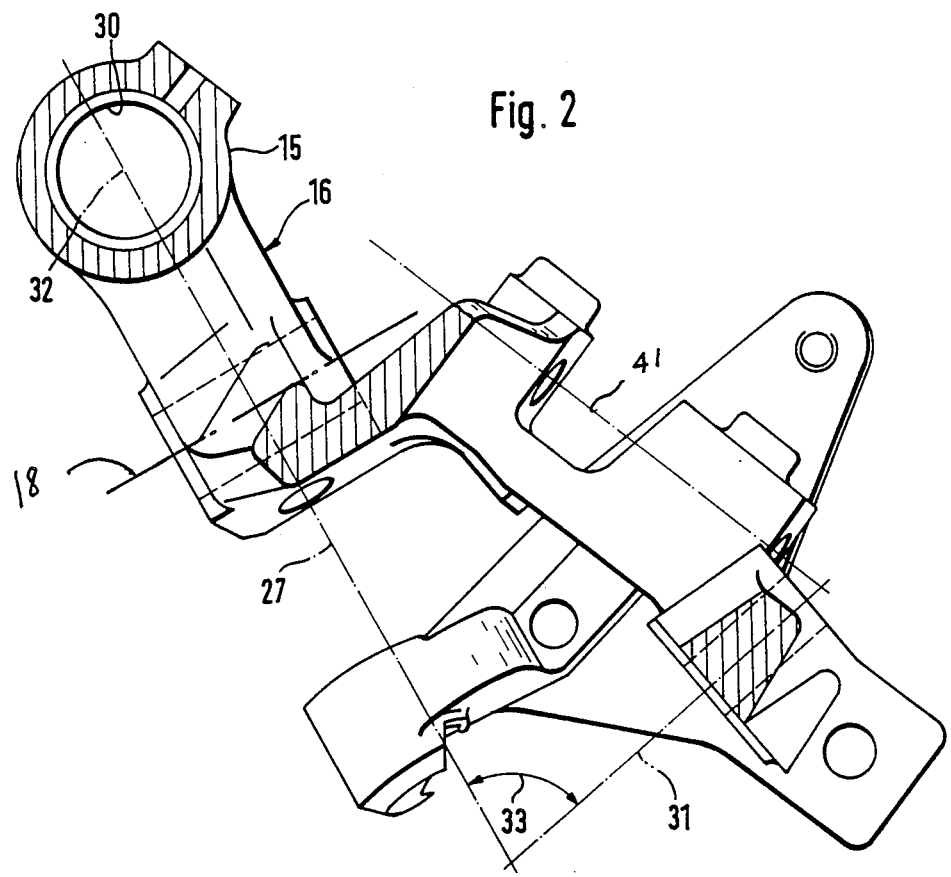
FIG. 2 shows a side view, partially in section, of the knotter frame of the twine knotter according to FIG. 1 approximately in the same position.
Figure 3:
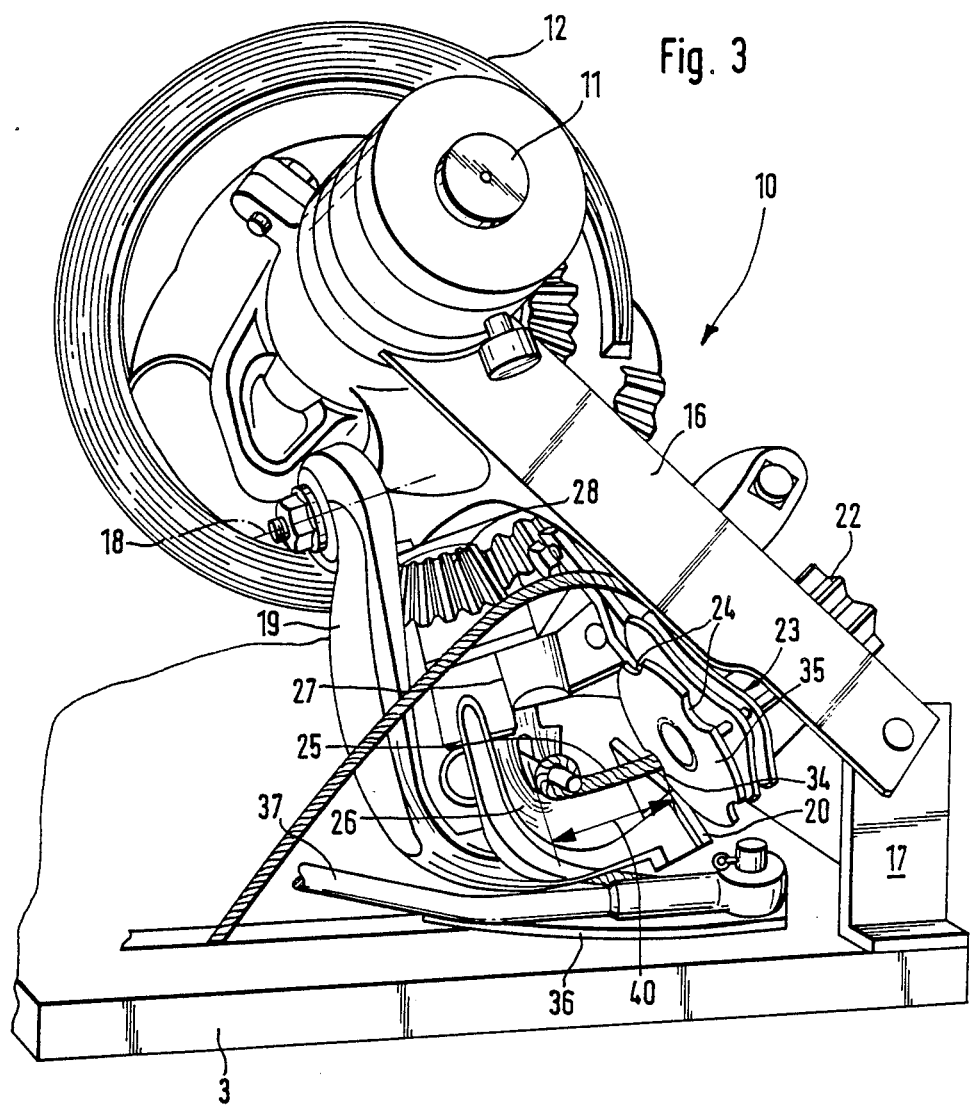
FIG. 3 shows a perspective veiw of the twine knotter according to the invention.

The knotter frame 16, shown partially in FIG. 2, is located on the knotter shaft 11 by means of an inner bore 30 of the bearing lug 15. The axis 31 of the driver 23 forms with the axis 27 of the knotter hook, in a plane perpendicular to the axis 32 of the knotter shaft, an angle 33 which is smaller than on conventional twine knotters, in particular less than 78°. (The axis 32 of the main knotter shaft 11 (FIG. 3) is cut by axis 27 which lies in the same plane as axis 32.) Thus as is evident from FIG. 1, during the time when the driver 23 and also the knife 20 maintain their position relative to the press channel, the axis 27 of the knotter hook 26 is pivoted to the left according to FIG. 1, so that the distance between the knotter hook 26 and the knife 20 become greater than normal. In this way the free knot ends become longer, and a bulky knot, such as one made with a thick baler twine, can be pulled together until it is secure, without the knot ends being capable of slipping through the knot.

The twine knotter 10 is shown once again in perspective in FIG. 3. This illustrates the phase shortly before the twine strand 25 leading from the knotter hook to the driver is severed. The knotter hook 26 has made the knot, and the twine strand extends through one of the four edge recesses 34 in the disk 35 of the driver 23. The knife 20 moves forward on the knife lever 19 and severs the twine strand 25 at a point located at a distance 40 from the mid-plane of the knotter hook 26 which, in the working position illustrated, runs through the axis of the knotter shaft.

The distance 40 is at least 40 mm, preferably 42 to 44 mm, so that the projecting ends of the twine strands 25, 25', the so-called knot ends, remaining outside the knot, that is to say between the knotter hook 26 and the knife 20, are long enought to ensure that the knot can pull together completely, at the same time drawing in part of these knot ends, without one of the knot ends going into the knot and the knot opening.

36 denotes the twine lock which is pivotable parallel to the top-side 3 of the press channel 1 and which is moveable in time with the twine knotter 10 by means of a guide bar 37 and feeds the twine strand 25' conveyed upwards by the baling needle 9 to the knotter hook 26.

While an embodiment of the invention has been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A twine knotter using the Deering high-pressure system for agricultural baling presses, with a knotter shaft having an axis, with a knotter disk arranged fixedly in terms of rotation on the knotter shaft and having toothed segments and cam segments for driving the moveable functional parts, with a knife lever pivotable about an axis essentially perpendicular to the axis of the knotter shaft and having a knife arranged parallel to a pivoting plane, with a driver arranged on one side of the pivoting plane of the knife near the latter and rotataby in steps, in the form of a set of co-axial disks which are provided at the edge with aligned recesses for the twine and which interact with a twine holder engaging between the disks and hold the twine during pressing and cutting, and with a knotter hook located on the other side of the pivoting plane of the knife and rotating about an axis which is in a plane passing through the axis of the knotter shaft and essentially perpendicular to the axis of the knife lever and which forms a very acute angle perpendicular to the axis of the knotter shaft in this plane, wherein the distance (40), measured along the twine strand (25), between the midplane of the knotter hook (26) and the pivoting plane of the knife (20) is at least 40 mm.

2. A twine knotter as claimed in claim 1 wherein the distance is 40 to 42 mm.

* * * * *